No. 788,063. PATENTED APR. 25, 1905.
M. L. QUINN.
DEVICE FOR TEACHING MUSIC.
APPLICATION FILED FEB. 18, 1903.
2 SHEETS—SHEET 1.
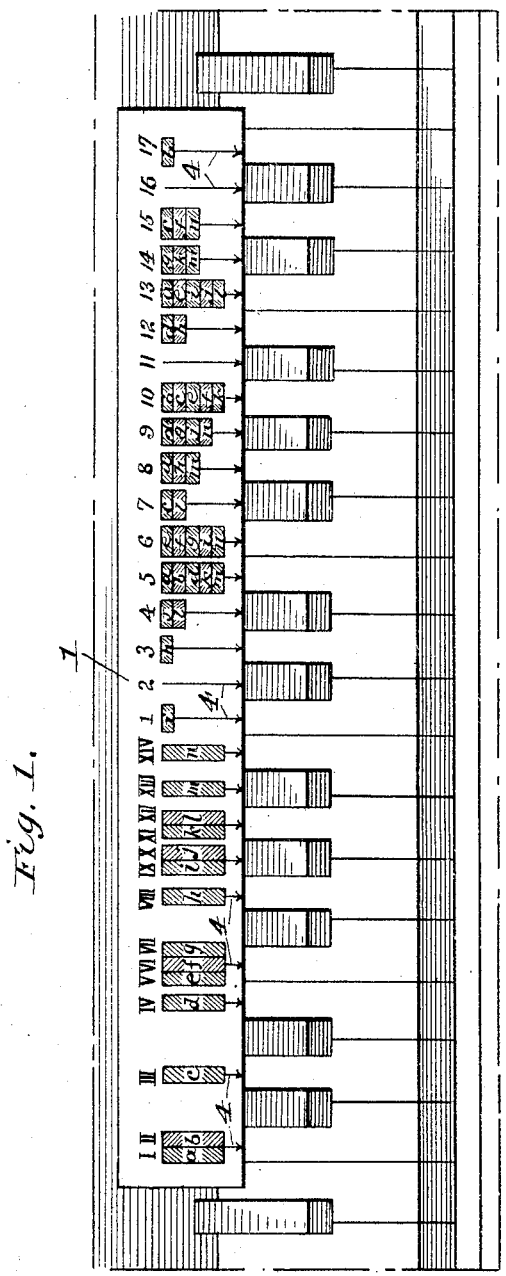
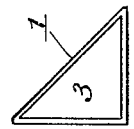
Witnesses
Chas. B. Gillson
E. M. Klatches
Inventor
Marcus L. Quinn,
By his Attorney

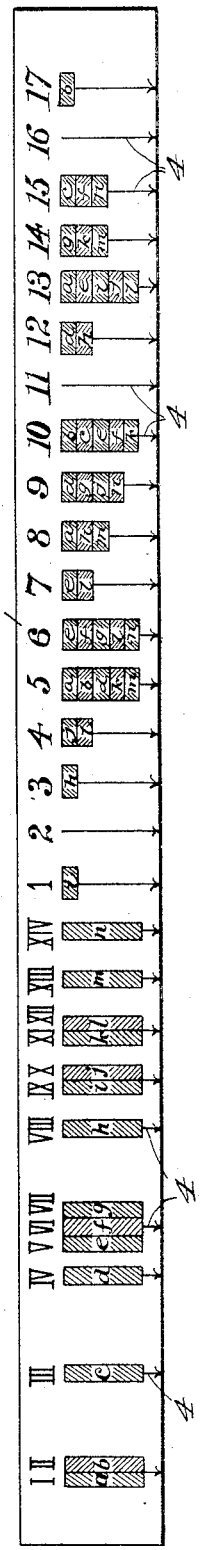

No. 788,063.                                                          Patented April 25, 1905.

UNITED STATES PATENT OFFICE.

MARCUS L. QUINN, OF CHICAGO, ILLINOIS.

DEVICE FOR TEACHING MUSIC.

SPECIFICATION forming part of Letters Patent No. 788,063, dated April 25, 1905.

Application filed February 18, 1903. Serial No. 143,962.

*To all whom it may concern:*

Be it known that I, MARCUS L. QUINN, a citizen of the United States, and a resident of Chicago, in the county of Cook and State of Illinois, have invented a Device for Teaching Music, of which the following is a specification.

This invention relates to devices for teaching music.

The objects of the invention are to provide a simple device by means of which a person can readily learn the chief and most useful chords of all keys and may readily be taught the chief chords of all keys related to the selected key, to provide a device whereby it is possible to transpose into different keys, and to provide a device for teaching harmony exercises, melodies, and simple songs and pieces.

By means of a device of my invention a person having no knowledge of music or of musical notation can quickly and easily learn the chief and most useful chords of all keys by means of a simple non-technical system of notation; may readily be taught to produce all kinds of modulations and transitions; may transpose into any desired key, retaining correct modulations and transitions; may be taught harmony exercises, accompaniments, scales, and simple songs and pieces.

A device of my invention is of great advantage to a person about to take up the study of music in order to educate the ear and to develop an intuitive knowledge of the correct correlation of tones and practice in producing them on a piano, organ, or other key instrument.

The invention consists of the various features, combinations of features, and details of construction hereinafter described and claimed.

In the accompanying drawings a device of my invention is fully illustrated.

Figure 1 is a perspective view of a portion of a piano-keyboard, showing a device of my invention applied thereto. Fig. 2 is a plan view of a device of my invention. Fig. 3 is an end view thereof, and Figs. 4 and 5 are exercises illustrating the manner of using a device of my invention and also different uses to which it may be put.

Referring now to the drawings, 1 designates a strip or plate of suitable material, preferably celluloid or the like, adapted to be placed on the keyboard of a piano, organ, or other instrument, preferably adjacent to the inner ends thereof. Said plate 1 is preferably only long enough to extend over approximately two and one-half octaves of the keyboard of the instrument and is entirely detached therefrom, so that it may conveniently be moved or placed in different positions on the keyboard. Preferably, also, said plate or strip 1 is secured to a suitable support, so that it will be rearwardly inclined to the plane of the keys, the lower edge of said strip or plate extending to the lower edge of said support. As shown, said support consists of a triangular piece 3 of light wood, as soft pine, the front surface of which is rearwardly inclined relatively to the base or bottom thereof. If desired, the bottom and rear surfaces of the supporting-block 3 may be covered with felt or other soft cloth, so that the finish of the instrument will not be marred thereby.

Formed on the face of the strip or plate 1 are indexes 4, which preferably extend upwardly from the lower edge of said strip or plate. The distance between adjacent indexes is equal to one-twelfth (1-12) of the combined width of seven adjacent white keys measured on the keyboard of the instrument, or a multiple thereof, there being indexes to designate the chief and most useful chords of a selected key and also of all related keys into which any musical composition may modulate. The distances between indexes may vary slightly, though it is preferable that they be exact, as the best register is thereby secured when the device is moved into different positions on the keyboard, as hereinafter described.

The indexes for the white keys are referred to the narrow portions thereof between the black keys.

In the preferable form of the device the instrument-keys of the different chords are indicated by indexes of different colors, the keys of each chord being designated by the same color; but my invention contemplates any other convenient method of differentiation. It being impossible to color the indexes in the drawings, I have made use of letters to indicate the different chords, the indexes of the keys of each chord having the same letter.

As shown, fourteen different chords are represented, which include all of the chief and most useful chords. By means of the chords indicated all kinds of modulations and transitions may be produced. Obviously, however, it is possible to omit certain of the chords indicated, correspondingly limiting the scope of the device, or, on the other hand, other chords which are used only infrequently may be indicated without in any way departing from my invention.

The chords indicated are those known in musical terminology as follows, and each chord is indicated by the letter stated: tonic, $a$; submediant, $b$; major supertonic, $c$; dominant triad in the key of the parallel minor, $d$; subdominant, $e$; supertonic, $f$; major triad on the minor second degree of the scale, $g$; dominant, $h$; minor subdominant, $i$; major triad on the minor sixth degree of the scale, $j$; dominant triad in the key of the supertonic, $k$; supertonic ninth or diminished seventh, $l$; tonic ninth or diminished seventh, $m$; dominant ninth or diminished seventh, $n$.

One of the indexes—as shown, the extreme left-hand index—is marked $a$ and designates the key-note or bass note of the tonic chord, and by setting the strip or plate so that said left-hand index will be over any key of the keyboard of the instrument selected as a key-note the indexes will correctly indicate chords in that key and in all related keys. Thus by moving or shifting said strip or plate so that the key-note index will register with different keys it is possible to transpose into different keys, as desired.

In setting the device for any key the key-note index $a$ is preferably set so as to register with the center of the key, though slight variations will not throw the indexes of the other keys out of register.

The correct modulations and transitions of the various chords may be taught by means of suitable exercises by using a simple system of notation which will be readily understood by a person having no knowledge of music or of musical notation.

In practice I prefer to use a simple system of notation, as follows: Each chord is designated by means of a suitable distinctive character applied to the bass note thereof. As shown, Roman numerals placed directly above the indexes which they respectively designate are employed. Whenever it appears in a chord exercise each Roman numeral signifies that the chord consisting of the tones produced by the instrument-keys indicated by the indexes marked the same as the index of the bass notes to which said numeral is applied is to be struck. Any desired succession of chords may thus be indicated by means of an exercise in which the numerals or other characters representing the bass notes of the desired chords are arranged in a series, each numeral being repeated as many times as that chord is to be repeated.

As shown in Fig. 2, the indexes of the bass notes are numbered consecutively from I to XIV, beginning with the left-hand index, this being what I consider the simplest system of notation.

For the purpose of illustration I have in Fig. 4 of the drawings shown a simple form of exercise. As will be noted, the numerals I and VIII appear in the following succession: I three times, VIII once, I twice, VIII once, and I once. This exercise signifies that the chord the bass note of which is designated by the numeral I is first to be struck three times, followed by the chord the bass note of which is designated by VIII struck once, I chord twice, VIII chord once, and I chord once.

By means of proper exercises, which indicate the correct transitions and modulations of any key in which the device is set, the correct modulations and transitions for any key may soon be learned, so that by moving or shifting the device into different keys all of the indicated chords in all of the keys with their correct modulations and transitions can be learned quickly and easily. The ear of the student will thus be educated, so that though he may have no knowledge of music or musical notation he will recognize different chords and know where to find them on the keyboard and will also know how to play them, and by then simply learning the technical names of the different chords and the signatures denoting the same he can play any chord desired without reference to my improved device.

As arranged in the drawings the letter $a$ is applied to the indexes designating the instrument-keys of the tonic chord. The device is arranged in Fig. 1 so that this index is on the bass note "C" of the chord, the higher notes of the chord being designated by the same index-letter $a$, these higher notes being "E," "G," and "C." As thus arranged the index-letter $b$ designates the bass note "C" of the submediant chord, the higher notes of this chord being also designated by the letter $b$. These higher notes of the submediant chord are "E," "A," and "E." These notes are clearly indicated in Fig. 1 of the drawings by letters; but it will of course be understood that I may indicate them by colors, as previously described. When using colors as index-marks, I prefer to arrange them as the blocks are shown in Figs. 1 and 2 of the drawings, the long vertical blocks designating the bass notes of the chords and the short horizontal blocks designating the higher notes.

From the foregoing it will be readily understood that each of the fourteen chords illustrated consists of one bass note or tone and three treble tones, each of which is indicated by the same index character or color, it being of course understood that as used herein the term "character" is intended to embrace and include colors as well as letters or numbers or other symbols.

As the index character $a$ designates the notes of the tonic chord, the device must be arranged on the piano-keyboard so that the bass note or key tone of the desired key is indicated by said index character $a$, and when so arranged the notes of all the other chords are properly indicated by the other index characters.

It is also very desirable that the bass notes of the chords be indicated by distinctive notation-symbols and that the treble notes of the chords be indicated by another series of notation-symbols in order that a simple system of notation may be used for the purpose of writing exercises. It will be readily understood that where the tones of the chords are indicated by colors some simple system of notation must be adopted in order that exercises may be written in a practical way. It is also desirable that the bass notes of the chords be distinguished from the treble notes to facilitate the arranging of the device on the keyboard.

A beginner in music thus learns music as a child learns to talk, learning to do the thing itself without in the least understanding the reason for or science of that which he is doing, which will follow as a later step and be much more easily and quickly acquired. The systems of teaching music now in common use are as though a child were taught to talk by first teaching him the rules of grammar, syntax, &c. My system, however, reverses this order, following the natural method—first teaching the pupil to do the thing itself, leaving him to learn the reason for and science of what he does until he is older and more mature and can more easily understand them.

In its preferable form a device of my invention is made of such length that the keys of each chord will be indicated but once and in their proper positions on the keyboard of the instrument. It is thus impossible for a person to strike other than the desired keys, whereas were the different keys designated more than once and in different octaves a person would not know which keys or set of keys to strike, with which key to begin, or in what sequence they were to be struck.

The relative positions of the keys indicated is adapted to cover the range of the large proportion of simple music.

A further feature of my improved device consists in providing the indexes of the treble keys with suitable distinctive characters, by means of which they may readily be indicated and distinguished both from each other and from the bass keys. In practice I use Arabic numerals to indicate the treble notes, the bass notes being indicated by Roman numerals, as before.

Indicating the notes in the manner last described is for the purpose of providing a simple non-technical system of notation, which will be readily understood adapted for use in connection with a device of my invention for teaching exercises in harmony, scales, melodies, and simple songs and pieces to beginners.

The device thus embodies two features which are entirely independent of each other, excepting that they may be conveniently combined, the Roman numerals or other characters used to designate the bass notes serving the double purpose of designating the different series of indexes representing the various chords in one system and the bass notes in the other system, the treble notes being indicated by the Arabic numerals, while the chord-indexes serve to connect the numerals or other characters with their proper instrument-keys.

It will be noted that each treble key within the range of the device is numbered, a dart or arrow being used to connect the numerals not having corresponding chord-indexes with their proper keys.

The reason that all of the keys are indicated in one system and not in the other is that in harmony exercises, melodies, songs, and pieces it may be necessary to use all of the treble notes, while in playing chords and accompaniments all of the notes or keys are not used, and those only are indicated which are actually used.

As shown in the drawings, the bass-keys are indicated by Roman numerals, being numbered consecutively from left to right, and the treble keys are indicated by Arabic numerals, being likewise numbered consecutively from left to right.

For purposes of illustration I have in Fig. 5 of the drawings shown a simple exercise to be used by beginners in connection with my improved device in learning pieces and the like. The arrangement of the numerals in vertical rows indicates that the instrument-keys designated by the numerals in each vertical row are to be struck together, the different series indicated by each vertical row to be struck consecutively from left to right.

The lengths of the notes and their other qualities may be indicated in any suitable or desired manner. This, however, has no connection with my device and need not be considered at this time.

I claim—

1. A device for teaching music comprising a strip or bar adapted to be placed upon the keyboard of an instrument and having marked thereon a series of indexes which are spaced apart a distance substantially equal to the distance between the centers of two adjoining keys or a multiple of said distance, each index having applied thereto an indicating character, the characters indicating the notes of each chord being identical with each other and different from all the other designating characters, the bass notes of the chords being indicated by an additional and distinctive symbol, said symbol being different from all the other symbols on the bar, whereby said bass notes may be readily identified.

2. A device for teaching music comprising a strip adapted to be placed upon the keyboard of an instrument and having marked thereon a series of indexes which register with the keys, each index having applied thereto a note-indicating color, the notes of each chord being indicated by the same color and the color of the notes of each chord being different from all the other colors, the bass notes of the chords being indicated by an additional distinctive notation-symbol.

3. A device for teaching music comprising a strip adapted to be placed upon the keyboard of an instrument and having marked thereon a series of indexes which are spaced apart a distance equal to the distance between the centers of two adjoining keys, or a multiple of said distance, each index having applied thereto a note-indicating color, the notes of each chord being indicated by the same color and the color of the notes of each chord being different from all the other colors, the bass notes of the chords being indicated by color-spots of one shape and the treble notes by color-spots of a different shape, the bass notes of the chords being indicated by an additional distinctive notation-symbol.

4. A device for teaching music comprising a strip or bar adapted to be placed upon the keyboard of an instrument and having marked thereon a series of indexes which register with the keys, each index having applied thereto an indicating character, the characters indicating the notes of each chord being identical with each other and different from all the other designating characters, and a notation character applied to each index.

5. A device for teaching music comprising a plurality of indexes spaced to register with the keys of an instrument, the instrument-keys of each chord being indicated by similar indexes differentiated from the indexes denoting the instrument-keys of all of the other chords represented, a distinctive character to designate each series of similar indexes applied to the bass note thereof, and a distinctive designating character applied to each treble note and differentiated from the chord-indexes applied to said treble notes, substantially as described.

6. A device for teaching music comprising a plurality of colored indexes adapted to register with the keys of an instrument, the keys of each chord being indicated by indexes of the same color and the different chords being indicated by indexes of different colors, and a distinctive notation character to designate each series of indexes of the same color and applied to the bass notes of the chords.

In testimony that I claim the foregoing as my invention I affix my signature, in presence of two subscribing witnesses, this 31st day of December, A. D. 1902.

MARCUS L. QUINN.

Witnesses:
M. S. SOMERVILLE,
HARRY R. L. WHITE.